United States Patent [19]

Nakashin

[11] 4,370,113

[45] Jan. 25, 1983

[54] APPARATUS FOR REPAIRING LEAKS IN UNDERGROUND PIPE

[76] Inventor: Yasushi Nakashin, 67-28 Isobe, Chiba-shi, Japan

[21] Appl. No.: 281,774

[22] Filed: Jul. 9, 1981

[30] Foreign Application Priority Data

Jul. 9, 1980 [JP] Japan .............................. 55-092663

[51] Int. Cl.³ ............................................. B29D 23/08
[52] U.S. Cl. ...................................... 425/13; 425/112; 425/122; 425/59; 425/62
[58] Field of Search ...................... 425/11, 13, 14, 59, 425/62, 63, 110, 112, 115, 122, 126 R, 129 R

[56] References Cited

U.S. PATENT DOCUMENTS

| | | | |
|---|---|---|---|
| 2,484,018 | 10/1949 | Crown | 425/110 X |
| 2,851,061 | 9/1958 | Bernard et al. | 425/13 X |
| 2,894,539 | 7/1959 | Cook et al. | 425/13 X |
| 3,044,136 | 7/1962 | Perkins | 425/115 X |
| 3,091,013 | 5/1963 | Robinson | 425/59 |
| 3,797,981 | 3/1974 | Van Dijk | 425/110 |

Primary Examiner—J. Howard Flint, Jr.
Attorney, Agent, or Firm—Finnegan, Henderson, Farabow, Garrett & Dunner

[57] ABSTRACT

An apparatus for repairing leaks in underground pipe which comprises a carriage movable axially along the pipe, a flexible and stretchable tubular cover sheet surrounding a portion of the carriage, a plurality of power driven back-up plates supported by the carriage and expandable radially to press the sheet into intimate contact with the internal wall surface of the pipe, and retractable radially for separating the sheet from the pipe wall, and a conduit inside the cover sheet for delivering grout radially outwardly through the cover sheet.

11 Claims, 4 Drawing Figures

APPARATUS FOR REPAIRING LEAKS IN UNDERGROUND PIPE

BACKGROUND OF THE INVENTION

The present invention relates to an apparatus for repairing joints, cracks, or leaking points in underground hollow pipe such as water pipe, sewer pipe, or cable duct.

Underground pipes can generally be classified into three categories: (1) large diameter pipes which allow free access by a man and repair equipment; (2) medium diameter pipes which allow a man to enter such as by crawling, but which are too small to allow easy handling of equipment and repair; and (3) small diameter pipes which a man cannot enter.

In repairing a small diameter pipe such as in category (3) above, it is possible to employ a process such as is disclosed in Japanese Pat. No. 929,664 (laid-open publication No. SHO 49-118210). In this process, an expandable bag is inserted into the pipe and is pneumatically inflated to bring the bag into firm contact with the inside wall of the pipe. Thereafter, a hardenable chemical (grout) is poured between the pipe and the bag through an aperture in the bag to seal the leak.

In repairing large diamater pipes as described above in category (1), a worker can manually place an annular rubber sheet into engagement with the pipe wall and the sheet can be pressed (expanded) into engagement with the pipe wall by manually operated jacks. Thereafter, the hardenable chemical (grout) is poured through an opening in the sheet to seal the pipe leak.

The difficulty has arisen with respect to repairing leaks in the medium size pipes described above in category (2). Thus, in that category pipe, it is dangerous to utilize the pneumatically expandable bag described above for category (3). The large amount of high pressure air required for inflating the bag in this environment stores up an enormous amount of potential energy which, if the bag breaks, can result in an explosive air flow. Also, difficulties arise in attempting to align the grout opening through the bag with the pipe leak location. The technique described above for the large diameter pipes, category (1), also is not particularly useful for the medium diameter pipes because of the confined area inside these pipes and the requirement that the jacks be manually actuated.

SUMMARY OF THE INVENTION

The present invention provides an apparatus which is capable of quickly and efficiently carrying out repair of leaks in underground pipes of a medium size, i.e., pipes which allow entry of a man but which are relatively confining. The apparatus of this invention is safe in operation and results in a proper and complete seal of the pipe leak. The apparatus of this invention is also useful in the repair of leaks in large diameter pipe and increases the efficiency and effectiveness of that operation.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the repair apparatus of this invention comprises a movable carriage adapted to enter and to be displaced axially along a pipe, a flexible and stretchable tubular cover sheet surrounding at least a portion of the carriage and adapted to be brought into intimate contact with the internal wall surface of the pipe to cover a leaking part thereof, a plurality of back-up plates supported by the carriage within the cover sheet and radially expandable for pressing the cover sheet against the internal wall surface of the pipe and retractable for separating the sheet from the wall, a power-driven mechanism supported by the carriage for actuating the back-up plates, and a conduit inside the cover sheet and adapted to deliver grout radially outwardly through the approximate axial center of the cover sheet.

The accompanying drawings which are incorporated in and constitute a part of this specification, illustrate one embodiment of the invention and, together with the description, serve to explain the principles of the invention.

DESCRIPTION OF THE PREFERRED EMBODIMENT

Reference will now made in detail to the present preferred embodiment of the invention, an example of which is illustrated in the accompanying drawings.

Figure 1:
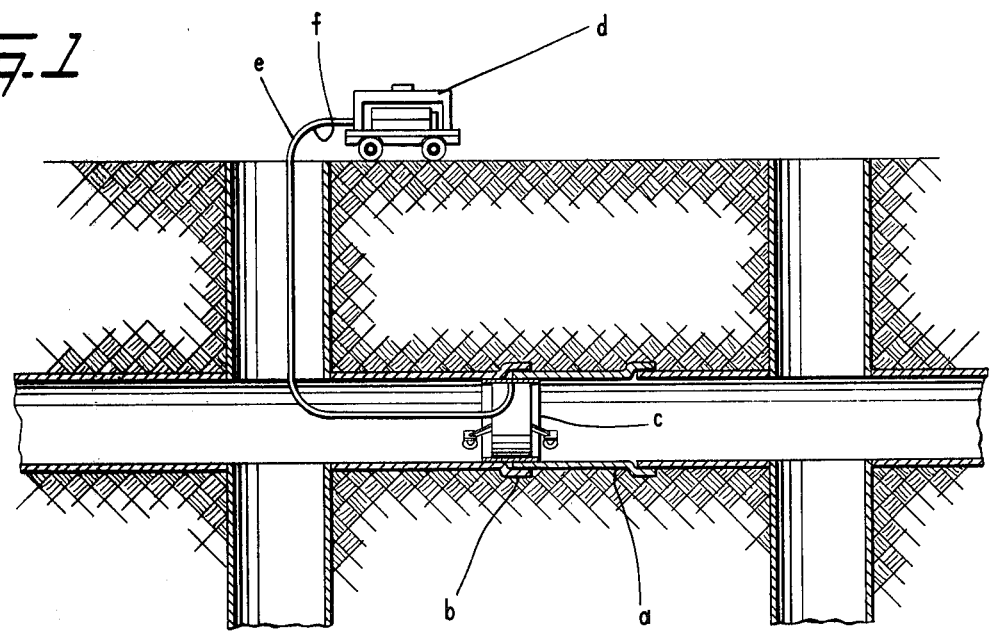
FIG. 1 is a schematic view showing the apparatus of the preset invention in use in repairing a leak in an underground pipe.

There is depicted in FIG. 1 an underground pipe a having a joint b at which there is a leak. Repair apparatus c constructed in accordance with the present invention is shown in position with the pipe at joint b. The repair apparatus c is connected by means of pressurized fluid pipe e and grout pipe f to a pump station d which is above ground.

In accordance with the present invention, the repair apparatus comprises a movable carriage adapted to enter and be displaced axially along the pipe. As embodied herein and shown in FIGS. 2 and 3, a carriage including a cylindrical shaped cylinder block 4 has a pair of supporting legs 2 extending from the front and from the rear thereof. Each of the supporting legs 2 has a caster 1 at its base. The legs 2 of each pair angle outwardly away from each other (FIG. 3) so that the casters 1 can engage the inside wall surface of a pipe 10. The carriage is therefore movable axially along the pipe (10) after being positioned therein such as manually by a man within the pipe 10.

In accordance with the present invention, a flexible and stretchable tubular cover sheet surrounds at least a portion of the carriage and is adapted to be brought into intimate contact with the internal wall surface of the pipe to cover the leaking part thereof. As embodied herein and shown in FIG. 2, a tubular cover sheet 7 surrounds a central portion of the carriage. The cover sheet 7 is constructed of a rubber or rubber-like material and has a thickness of about 20 to 40 mm. The rubber sheet 7 is movable with the carriage axially along the pipe 10. In the position shown in FIG. 2, the rubber sheet 7 is located at the pipe joint b where a leak might occur. As hereinafter described, the rubber sheet 7 is adapted to be brought into intimate contact with the internal wall surface of the pipe 10 to cover the joint b.

Figure 2:
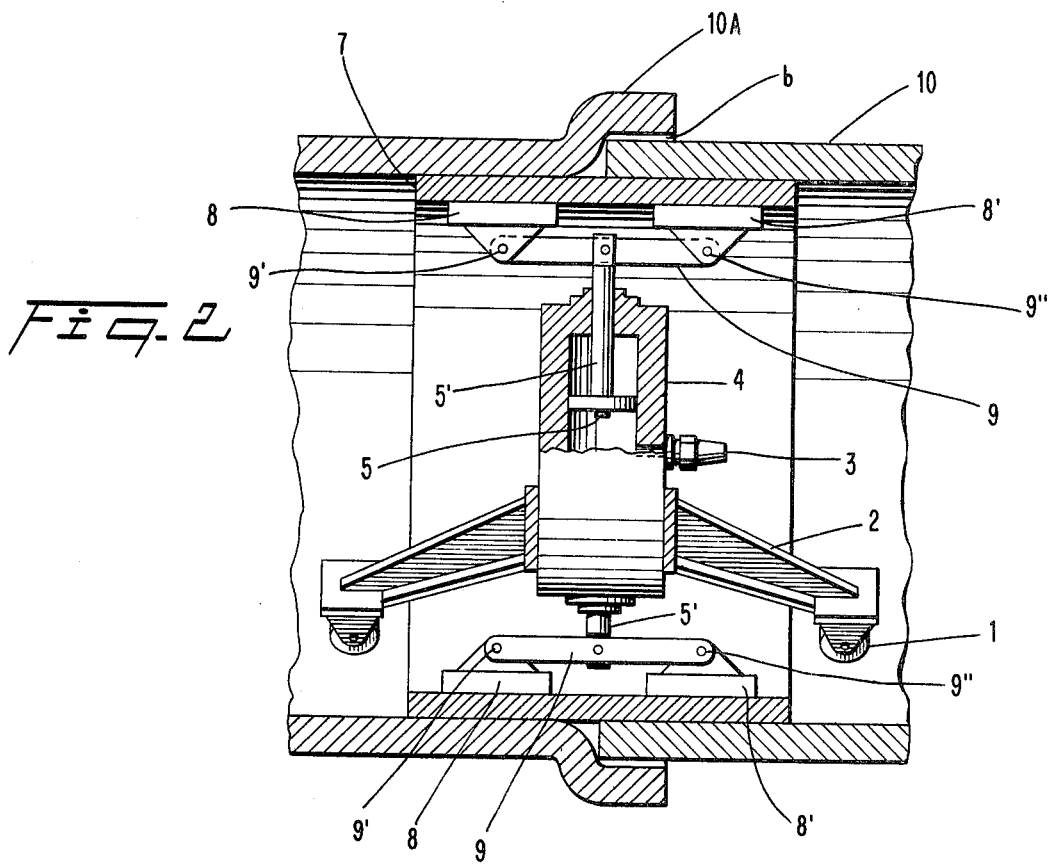
FIG. 2 is a longitudinal cross sectional view of the pipe repair apparatus of the present invention shown in position in a pipe.
Figure 3:
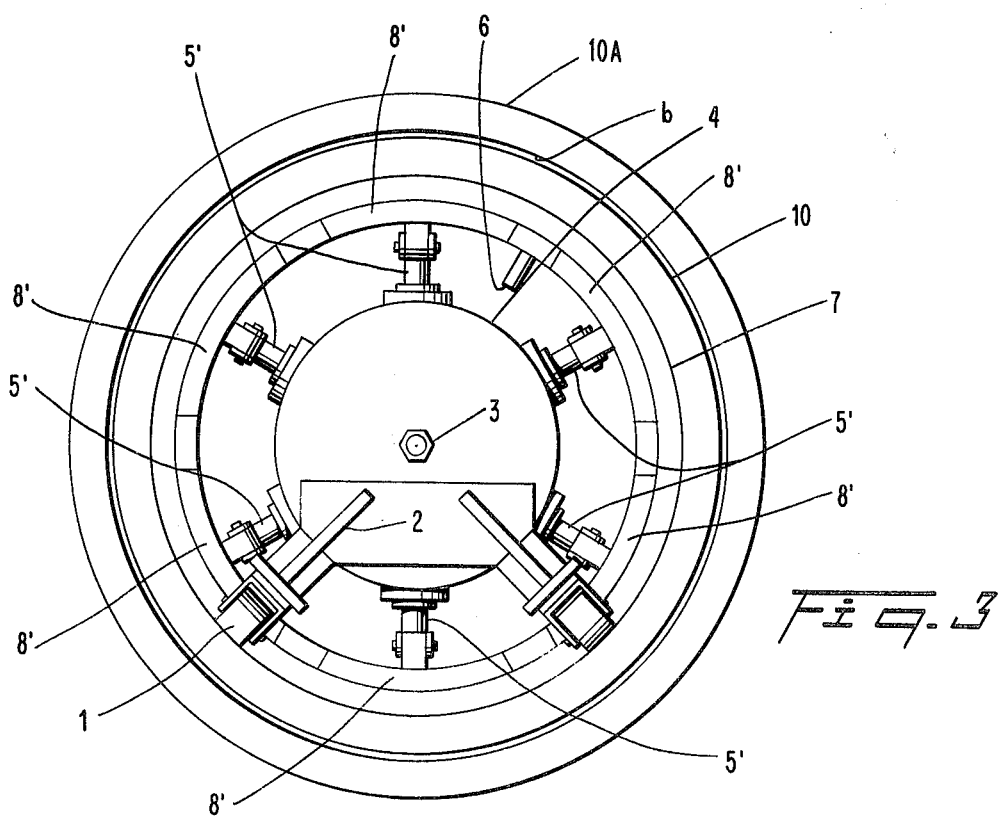
FIG. 3 is an end view of the structure of FIG. 2.

In accordance with the invention, a plurality of back-up plates are supported by the carriage and are expandable radially for pressing the cover sheet against the internal wall surface of the pipe. The back-up plates are also retractable radially for separating the cover sheet from the pipe wall. As embodied herein, a plurality of pairs of back-up plates 8, 8' are disposed within the cover sheet 7. Each of the back-up plates is arcuate in configuration and the pairs of back-up plates form two rows which are axially spaced a distance of about 20 mm. at the approximate axial center of the cover sheet 7 (see FIG. 2). While the number of back-up plates in each row can vary, there is shown six such plates in each row (see FIG. 3). In addition, the adjacent plates in each row of back-up plates are overlapped as shown in FIG. 3 for a purpose hereinafter to be described.

It will be appreciated that when the back-up plates 8, 8' are moved radially outwardly away from cylinder block 4, the cover sheet 4 is expanded radially and pressed against the internal wall surface of pipe. When the back-up plates are retracted radially, the cover sheet 7 is separated from the pipe wall.

Figure 4:
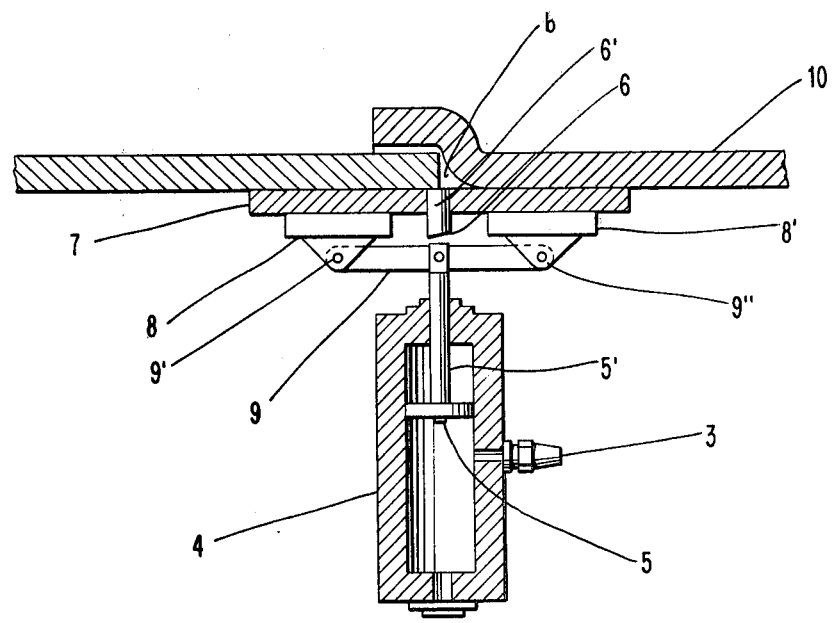
FIG. 4 is a schematic view showing the relationship of parts of the structure of this invention.

In accordance with the invention, a power-driven mechanism is supported by the carriage for actuating the back-up plates. As embodied herein, the cylinder block 4 is formed with a plurality of radially extending cylinders, one of which is shown in FIG. 2 and schematically in FIG. 4. A piston 5 is slidably disposed in each of the cylinders and each has a piston rod 5' which extends radially outwardly of the cylinder block 4. The outer end of each piston rod 5' is connected by a pin to a support link 9 each which in turn is connected by pins 9', 9" to a respective pair of back-up plates 8, 8' (see FIGS. 2 and 4). A hose 3 connects a pressurized fluid source at pump station d to the cylinder block 4 and is adapted to deliver pressurized fluid to each of the cylinders simultaneously. Therefore, when pressurized fluid is admitted to the cylinder block 4 through the hose 3, all of the back-up plates 8, 8' are moved radially outwardly in synchronization.

Radial outward movement of the piston rods 5' causes the back-up plates 8, 8' also to move radially outwardly and stretches and presses the cover sheet 7 against the internal wall surface of pipe 10. Since each of the back-up plates overlaps its adjacent plate, the expanding back-up plates act around the entire inner circumference of the cover sheet 7. In addition, the pivotal connection between each of the piston rods 5' and its associated pair of back-up plates 8, 8' which is provided by the support links 9 and pins 9', 9" insures that the cover sheet 7 is brought into intimate contact with the internal pipe surface even if the sections of pipe 10 on opposite sides of the joint b are misaligned.

As still further embodied herein, the cover sheet 7 can be constructed to have a relatively hard inner layer and a softer outer layer. I have found that a rubber sheet having a total thickness of from about 20 to about 40 mm. constructed of two layers laminated together, the inside layer having a thickness of from about 10 to about 20 mm. and a hardness from about Hs (shore hardness) 40 to about Hs 50, and an outer layer, also having a thickness of from about 10 to about 20 mm. and a hardness of from about 30 Hs to about 40 Hs, to be satisfactory. Thus, even though the radius of curvature of the back-up plates 8, 8' does not conform exactly to that of the pipe 10, the relatively hard inner layer of the cover sheet 7 provides the necessary support while the relatively softer outer layer of the cover sheet 7 conforms to the internal pipe surface configuration.

In accordance with the present invention, a conduit is provided inside the cover sheet and is adapted to deliver grout radially outwardly through the approximate axial center of the cover sheet. As embodied herein a conduit 6 extends through a radial opening 6' at the approximate axial center of the cover sheet 7. The conduit 6 is the distal end of grout pipe f (FIG. 1) which supplies grout from pump station d and delivers it through the cover sheet 7.

In use, the carriage is inserted into the pipe 10 through, for example, a vertical shaft such as is shown in FIG. 1. The carriage is then positioned axially within the pipe 10 so that the approximate axial center of the cover sheet 7 is adjacent the joint b to be sealed. This positioning can be done manually in the case where the pipe 10 is of a diameter large enough to allow a man to enter. At this time, the back-up plates 8, 8' are retracted radially and the cover sheet 7 is separated from the internal surface of the pipe 10. This can be achieved by conventional means such as springs (not shown) acting on the piston rods 5' or by applying vacuum from pump station d through hose 3 to the cylinders. When the carriage is properly positioned within the pipe, fluid pressure is admitted through the hose 3 and causes the pistons 5 to move radially outwardly. This also causes the back-up plates 8, 8', to expand radially and presses the cover sheet 7 into intimate contact with the wall of pipe 10.

Since the back-up plates of each pair 8, 8' are spaced apart by a gap of approximately 20 millimeters, the zone of the pipe 10 at the joint b is not under pressure engagement by the back-up plates 8, 8'. A hardenable chemical (grout) is then injected through the conduit 6 and the opening 6' and enters the space between the cover sheet 7 and the pipe 10 at the joint b. Initially, the grout fills the zone between the cover sheet 7 and pipe 10 and then fills the joint b until the back pressure on the grout from outside the pipe 10 equals the pressure at the pump station d. After the grout has hardened, the pressure through the hose 3 to the cylinder block 4 is released and the pistons 5 are retracted as described above. This causes the back-up plates 8, 8' also to retract radially and the cover sheet 7 to separate away from the internal wall surface of the pipe 10. The carriage can then be moved to the next joint to be repaired or can be withdrawn from the pipe 10.

It will be apparent to those skilled in the art that various additions, substitutions, modifications and omissions can be made to the repair apparatus of the present invention without departing from the scope or spirit of the invention. Thus, it is intended that the present invention cover these additions, substitutions, modifications and omissions provided they come within the scope of the appended claims and their equivalents.

What is claimed is:

1. A repair apparatus for repairing leaks in underground pipe or the like comprising:
   a movable carriage adapted to enter and be displaced axially along said pipe;
   a flexible and stretchable tubular cover sheet surrounding at least a portion of said carriage and adapted to be brought into intimate contact with the internal wall surface of said pipe to cover the leaking part thereof;

a plurality of back-up plates supported by said carriage and expandable radially for pressing said sheet against the internal wall surface of said pipe and retractable for separating said sheet from said wall;

a power-driven mechanism supported by said carriage for actuating said back-up plates; and a conduit inside said cover sheet and adapted to deliver grout radially outwardly through the approximate axial center of said cover sheet.

2. A repair apparatus according to claim 1 wherein said cover sheet is formed of reinforced rubber material.

3. A repair apparatus according to claim 2 wherein said cover sheet is contructed of an outer layer having a thickness of from about 10 to about 20 mm. and a hardness of from about 30 Hs to about 40 Hs, and an inner layer having a thickness of from about 10 to about 20 mm. and a hardness of from about 40 Hs to about 50 Hs.

4. A repair apparatus according to claim 1 wherein said back-up plates are annularly arranged around the interior of said cover sheet.

5. A repair apparatus according to claim 1 wherein said back-up plates include a plurality of pairs of back-up plates which are annularly arranged in two rows axially spaced at the approximate axial center of said cover sheet.

6. A repair apparatus according to claim 5 wherein said back-up plates overlap with adjacent ones in each row.

7. A repair apparatus according to claim 5 wherein said back-up plate rows are spaced a distance of about 20 mm.

8. A repair apparatus according to claim 4 which includes link means connecting each adjacent set of axially spaced back-up plates, said power-driven mechanism including means connected to each respective link means.

9. A repair apparatus according to claim 1 wherein all said back-up plates are actuated in synchronization.

10. A repair apparatus according to claim 9 wherein said power-driven mechanism comprises a piston and cylinder means connected to each of said pairs of back-up plates and actuated from a single fluid pressure source.

11. A repair apparatus according to any one of claims 1 to 10 wherein said movable carriage is provided at the front and rear ends thereof with plural legs for supporting the power-driven mechanism, said back-up plates, and said cover sheet surrounding the middle portion of said movable carriage.

* * * * *